United States Patent
Sung et al.

(10) Patent No.: US 11,584,814 B2
(45) Date of Patent: Feb. 21, 2023

(54) ETHYLENE-VINYL ACETATE COPOLYMER AND PREPARATION METHOD THEREOF

(71) Applicant: LG Chem, Ltd., Seoul (KR)

(72) Inventors: Yutaek Sung, Daejeon (KR); Youn Sun Nam, Daejeon (KR); Choong Hoon Lee, Daejeon (KR); Young Hoon Na, Daejeon (KR); Jeongyong Lee, Daejeon (KR); Hyojoon Lee, Daejeon (KR)

(73) Assignee: LG Chem, Ltd.

( * ) Notice: Subject to any disclaimer, the term of this patent is extended or adjusted under 35 U.S.C. 154(b) by 124 days.

(21) Appl. No.: 17/046,038

(22) PCT Filed: Jul. 4, 2019

(86) PCT No.: PCT/KR2019/008211
§ 371 (c)(1),
(2) Date: Oct. 8, 2020

(87) PCT Pub. No.: WO2020/111428
PCT Pub. Date: Jun. 4, 2020

(65) Prior Publication Data
US 2021/0024667 A1   Jan. 28, 2021

(30) Foreign Application Priority Data
Nov. 26, 2018   (KR) .................. 10-2018-0147748

(51) Int. Cl.
*C08F 210/02*   (2006.01)
*C08F 210/08*   (2006.01)
*C08F 2/44*   (2006.01)

(52) U.S. Cl.
CPC .............. *C08F 210/02* (2013.01); *C08F 2/44* (2013.01); *C08F 210/08* (2013.01)

(58) Field of Classification Search
None
See application file for complete search history.

(56) References Cited

U.S. PATENT DOCUMENTS

| | | | |
|---|---|---|---|
| 4,123,600 A | 10/1978 | Kita et al. | |
| 8,137,774 B2 * | 3/2012 | Kendig | B32B 27/306 |
| | | | 156/308.2 |
| 10,961,333 B2 * | 3/2021 | Sung | C08F 10/02 |
| 2006/0149004 A1 | 7/2006 | Lee et al. | |
| 2014/0224314 A1 * | 8/2014 | Sato | H01L 31/18 |
| | | | 156/308.2 |
| 2020/0140586 A1 | 5/2020 | Sung et al. | |

FOREIGN PATENT DOCUMENTS

| | | | |
|---|---|---|---|
| DE | 161028 A1 | 8/1984 | |
| EP | 2698830 A1 | 2/2014 | |
| EP | 3539996 A1 | 9/2019 | |
| KR | 20060055898 A | 5/2006 | |
| KR | 20110064806 A | 6/2011 | |
| KR | 101237226 B1 | 2/2013 | |
| KR | 101349450 B1 | 1/2014 | |
| KR | 20140132667 A | 11/2014 | |
| KR | 101672618 B1 | 11/2016 | |
| KR | 20180055563 A | 5/2018 | |
| KR | 20190073250 A | 6/2019 | |
| WO | 2014181991 A1 | 11/2014 | |
| WO | WO-2019124675 A1 * | 6/2019 | ............. C08F 10/02 |

OTHER PUBLICATIONS

International Search Report for Application No. PCT/KR2019/008211 dated Nov. 5, 2019, 2 pages.
Extended European Search Report including Written Opinion for Application No. 19890250.4 dated Jun. 24, 2021, 8 pages.

* cited by examiner

*Primary Examiner* — Richard A Huhn
(74) *Attorney, Agent, or Firm* — Lerner, David, Littenberg, Krumholz & Mentlik, LLP

(57) ABSTRACT

Provided are an ethylene-vinyl acetate copolymer having a high degree of crosslinking by controlling a temperature difference in an autoclave reactor and an input ratio of an initiator during polymerization, even though a reduced amount of a crosslinking agent is used, and a preparation method thereof.

12 Claims, No Drawings

ETHYLENE-VINYL ACETATE COPOLYMER AND PREPARATION METHOD THEREOF

CROSS-REFERENCE TO RELATED APPLICATION

This application is a national phase entry under 35 U.S.C. § 371 of International Application No. PCT/KR2019/008211 filed Jul. 4, 2019, which claims priority from Korean Patent Application No. 10-2018-0147748 filed Nov. 26, 2018, all of which are incorporated herein by reference.

TECHNICAL FIELD

The present invention relates to an ethylene-vinyl acetate copolymer and a preparation method thereof, and more particularly, to an ethylene-vinyl acetate copolymer having a high degree of crosslinking and excellent physical properties such as mechanical strength, etc., and a preparation method thereof.

BACKGROUND ART

Ethylene vinyl acetate is a copolymer of ethylene and vinyl acetate. Depending on the content of vinyl acetate, ethylene vinyl acetate has a wide range of applications from hard materials to soft materials such as hot melt adhesives, and it has low crystallinity and excellent low-temperature characteristics and impact resistance, as compared with polyethylene.

Further, ethylene vinyl acetate is a thermoplastic polymer. However, it has rubber properties and has excellent electrical insulation and withstand voltage properties, and has excellent transparency, barrier property, adhesive property, UV property, etc. Therefore, ethylene vinyl acetate is widely used in tubes, packing materials, wire coating materials, electrical insulators, tapes, adhesives, various sheets, etc. Recently, its application has been widened to protective films or encapsulant materials of optoelectronic devices such as solar cells.

In general, ethylene-vinyl acetate copolymers may be prepared in either an autoclave reactor or a tubular reactor. Ethylene vinyl acetate prepared in the autoclave reactor generally has a wide molecular weight distribution, and ethylene vinyl acetate prepared in the tubular reactor has a narrow molecular weight distribution. Thus, ethylene vinyl acetate is generally prepared by selecting the reactor according to use thereof.

However, when the autoclave reactor in which backmixing occurs is used, a uniform and high reaction temperature may be maintained, and thus it is advantageous in that an ethylene-vinyl acetate copolymer having a high content of vinyl acetate may be prepared, as compared with use of the tubular reactor in which mixing occurs by turbulent plug flow.

Meanwhile, it is known that the ethylene-vinyl acetate copolymer has high transparency and adhesive properties, but its mechanical strength is generally low, as compared with polyethylene.

Recently, ethylene-vinyl acetate copolymer products have been frequently used as an encapsulant material that protects solar cell modules from moisture and dust. In this case, as the mechanical strength is excellent, performance of the encapsulant material may be increased.

Accordingly, there is a need to study a preparation method of improving mechanical strength of the ethylene-vinyl acetate copolymer.

DISCLOSURE

Technical Problem

To solve the above problems, the present invention provides an ethylene-vinyl acetate copolymer having a high degree of crosslinking by controlling a temperature difference in an autoclave reactor and an input ratio of an initiator during polymerization, even though a reduced amount of a crosslinking agent is used, and a preparation method thereof.

Technical Solution

To solve the above problems, one embodiment of the present invention provides an ethylene-vinyl acetate copolymer satisfying the following conditions of (1) to (4):

(1) a degree of crosslinking: 89% or more,
(2) a content of vinyl acetate: 25% by weight to 35% by weight with respect to the total weight of the copolymer,
(3) a melt index (190° C., 2.16 kg): 10 g/10 min to 20 g/10 min, and
(4) a ratio of $\eta^*/[\eta]$: 7500 to 9500.

(Herein, $\eta^*$ represents a complex viscosity at zero shear, as measured at 160° C., and $[\eta]$ represents an intrinsic viscosity, as measured at 25° C.)

Further, another embodiment of the present invention provides a method of preparing an ethylene-vinyl acetate copolymer, the method including the step of polymerizing an ethylene monomer and a vinyl acetate monomer in an autoclave reactor in the presence of an initiator, wherein the reactor includes three or more reaction zones, the initiator is introduced into the upper end and the lower end of the reactor, in which an amount of the initiator introduced into the lower end of the reactor is 12% by weight to 22% by weight of the total amount of the initiator, the reactor satisfies a relationship of a temperature (T1) of one or more reaction zones from the lowermost end>a temperature (T2) of one or more reaction zones from the uppermost end>a temperature (T3) of one or more reaction zones therebetween, and ΔT which is a difference between T1 and T2 satisfies 20° C. to 40° C.

Effect of the Invention

An ethylene-vinyl acetate copolymer according to the present invention may have a high degree of crosslinking and optimized physical properties, thereby exhibiting excellent effects in terms of mechanical strength, etc. Therefore, the ethylene-vinyl acetate copolymer may be usefully applied to solar cell modules.

Further, a method of preparing the ethylene-vinyl acetate copolymer according to the present invention may prepare the ethylene-vinyl acetate copolymer having a high degree of crosslinking by controlling a temperature difference in an autoclave reactor and an input ratio of an initiator during polymerization, even though a reduced amount of a crosslinking agent is used.

BEST MODE FOR CARRYING OUT THE INVENTION

The terms used in this description are just for explaining exemplary embodiments and are not intended to restrict the present invention. A singular expression may include a plural expression unless it is differently expressed contextually. It must be understood that the term "include", "equip", or "have" in the present description is only used for designating the existence of characteristics, steps, components, or combinations thereof, and do not exclude the existence or the possibility of addition of one or more different characteristics, steps, components, or combinations thereof.

In the present description, "room temperature" means a temperature of 23±2° C., specifically 25° C., unless otherwise mentioned.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, a method of preparing an ethylene-vinyl acetate copolymer according to a specific embodiment of the present invention will be described in more detail.

The ethylene-vinyl acetate copolymer according to an embodiment of the present invention satisfies the following conditions (1) to (4):

(1) a degree of crosslinking: 89% or more,
(2) a content of vinyl acetate: 25% by weight to 35% by weight with respect to the total weight of the copolymer,
(3) a melt index (190° C., 2.16 kg): 10 g/10 min to 20 g/10 min, and
(4) a ratio of $\eta^*/[\eta]$: 7500 to 9500

(where $\eta^*$ represents the complex viscosity at zero shear, as measured at 160° C., and $[\eta]$ represents the intrinsic viscosity, as measured at 25° C.).

The degree of crosslinking of the ethylene-vinyl acetate copolymer may be increased when a portion above Mp (peak molecular weight) in GPC (gel permeation chromatography) is increased. A method of increasing the portion above Mp is a method of increasing a molecular weight and LCB (long chain branch).

In the present invention, the degree of crosslinking of the ethylene-vinyl acetate copolymer may be increased by controlling a temperature difference in an autoclave reactor and an input ratio of an initiator during polymerization, even though a reduced amount of a crosslinking agent is used, as described below.

Specifically, the ethylene-vinyl acetate copolymer according to an embodiment of the present invention may have a degree of crosslinking of 89% or more. As the ethylene-vinyl acetate copolymer may have such a high degree of crosslinking, it maintains excellent adhesive force while exhibiting an improved mechanical strength characteristic. When the degree of crosslinking is less than 89%, there is concern about reduction of the mechanical strength characteristic and adhesive force. More specifically, the ethylene-vinyl acetate copolymer may have a degree of crosslinking of 89% to 95%, or 89% to 93%.

In the present invention, the degree of crosslinking of the ethylene-vinyl acetate copolymer may be determined as follows. A crosslinking agent is added to the ethylene-vinyl acetate copolymer, and after film manufacture and thermal lamination, the sheet is left in toluene, then a weight of the dry sheet is measured, and a ratio of the weight of the sheet after being left and dried with respect to the weight of the sheet before being left in toluene is determined. In detail, the crosslinking agent is mixed with the ethylene vinyl acetate (EV) copolymer as a base resin to manufacture a sheet, which is then crosslinked in a laminating machine at 140° C. for 14 minutes and 30 seconds. The crosslinked sheet is left in toluene for 15 hours, and then dried for 3 hours, followed by weighing. Thereafter, the measured weight ($W_i$) of the sheet before being left in toluene and the weight ($W_d$) of the sheet after being dried are used to calculate the degree of crosslinking according to the following Equation 1.

$$\text{Degree of crosslinking (\%)}=(W_d/W_i)\times 100 \quad \text{[Equation 1]}$$

Further, the vinyl acetate content of the ethylene-vinyl acetate copolymer is 25% by weight to 35% by weight with respect to the total weight of the copolymer.

When the vinyl acetate content in the ethylene-vinyl acetate copolymer is less than 25% by weight, there is concern about a reduction of an elongation property, elasticity, and an adhesive property. When the vinyl acetate content in the ethylene-vinyl acetate copolymer is more than 35% by weight, there is concern about a reduction of weather resistance. More specifically, the ethylene-vinyl acetate copolymer has a vinyl acetate content of 27% by weight to 30% by weight, 27.9% by weight to 29% by weight, or 27.9% by weight to 28.5% by weight, with respect to the total weight of the copolymer.

Further, the melt index (MI) of the ethylene-vinyl acetate copolymer may be 10 g/10 min to 20 g/10 min, as measured at 190° C. under a load of 2.16 kg. As described above, since the ethylene-vinyl acetate copolymer has a high degree of crosslinking and vinyl acetate content together with a low melt index of the above range, it may maintain an excellent mechanical property and excellent processability. If the melt index of the ethylene-vinyl acetate copolymer is less than 10 g/10 min, there is concern about reduction of processability. More specifically, the melt index of the ethylene-vinyl acetate copolymer may be 14 g/10 min to 19 g/10 min.

Further, the ratio of $\eta^*/[\eta]$ of the ethylene-vinyl acetate copolymer may be 7500 to 9500, or 7500 to 9000.

Meanwhile, the ratio of $\eta^*/[\eta]$, $\eta^*$, which is a complex viscosity at zero shear, means a viscosity at an angular frequency of 0, and is a parameter obtained from data points of a frequency sweep measured in the range of a practically measurable angular frequency using a rotational rheometer through an analysis program of in the rotational rheometer. The frequency sweep is measured at a temperature of 160° C. using the rotational rheometer. Further, $[\eta]$, which is an intrinsic viscosity, is a value obtained by extrapolating a reduced viscosity or an inherent viscosity of a polymer solution to a polymer concentration of 0, and is determined by measuring Newtonian viscosity using the rotational rheometer. In the present invention, $\eta^*$, which is the complex viscosity at zero shear, was measured at 160° C. by a method of measuring a melt viscosity using the rotational rheometer, and $[\eta]$, which is the intrinsic viscosity, was determined by measuring Newtonian viscosity using the rotational rheometer at room temperature, specifically 25° C.

In addition to the conditions (1) to (4), the ethylene-vinyl acetate copolymer may have a number average molecular weight (Mn) of 18,000 g/mol to 23,000 g/mol. As the ethylene-vinyl acetate copolymer has a high number average molecular weight of the above range, it exhibits a high degree of crosslinking. More specifically, the number average molecular weight may be 19,000 g/mol to 21,000 g/mol.

Further, the ethylene-vinyl acetate copolymer may have a molecular weight distribution (MWD) of 3.0 to 4.0. The molecular weight distribution means a ratio (Mw/Mn) of a weight average molecular weight (Mw) with respect to a number average molecular weight (Mn). As the ethylene-vinyl acetate copolymer has a molecular weight distribution of the above range, it exhibits an excellent balance between processability and mechanical strength. More specifically, the ethylene-vinyl acetate copolymer may have a molecular weight distribution of 3.2 to 3.5.

Meanwhile, in the present invention, the molecular weight distribution, the weight average molecular weight, and the number average molecular weight may be measured by size exclusion chromatography (SEC). Specifically, in the present invention, the ethylene-vinyl acetate copolymer sample is dissolved in 1,2,4-TCB (trichlorobenzene), and the weight average molecular weight (Mw) and the number average molecular weight (Mn) are determined using 1,2,4-TCB as a mobile phase at a temperature of 125° C. and at a flow rate of 1 ml/min, respectively. From the values, the molecular weight distribution (a ratio of the weight average molecular weight/the number average molecular weight) was calculated. In this regard, PLgel 10 μm Mixed-B (manufactured by Agilent) may be used as a column for SEC.

The ethylene-vinyl acetate copolymer may exhibit the above-described physical properties by reducing a temperature difference in an autoclave reactor during polymerization, and by controlling a gas flow in the reactor by controlling the amount of an initiator introduced into the upper end and the lower end of the reactor.

Specifically, the ethylene vinyl acetate according to an embodiment of the present invention may be prepared by a preparation method including the step of polymerizing an ethylene monomer and a vinyl acetate monomer in an autoclave reactor in the presence of an initiator. In this regard, the reactor includes 3 or more reaction zones, and satisfies a relationship of a temperature (T1) of one or more reaction zones from the lowermost end>a temperature (T2) of one or more reaction zones from the uppermost end>a temperature (T3) of one or more reaction zones therebetween, wherein ΔT which is a difference between T1 and T2 satisfies 20° C. to 40° C.

More specifically, the reactor includes 11 reaction zones, T1 is a temperature of five reaction zones from the lowermost end, T2 is a temperature of four reaction zones from the uppermost end, and T3 is a temperature of two reaction zones therebetween.

If ΔT exceeds 40° C., and thus the temperature difference in the reactor is too large, stability of the polymerization reaction may be affected. As the temperature difference in the reactor is smaller, it may be advantageous in terms of reaction stability. However, in this case, the desired degree of crosslinking may not be achieved due to an increase of wax, etc. Therefore, ΔT is preferably in the range of 20° C. to 40° C.

Meanwhile, the temperature of each reaction zone of the autoclave reactor may be measured by a thermocouple installed in the corresponding zone, and in the present invention, the temperature of the uppermost end of each reaction zone was measured. For example, in a reactor consisting of eleven reaction zones, T1 is a temperature measured at a fifth reaction zone, T2 is a temperature measured at an eleventh reaction zone, and T3 is a temperature measured at a seventh reaction zone.

Under the conditions satisfying ΔT, the temperature in the autoclave reactor may be 150° C. to 220° C., T1 may be 180° C. to 220° C., T2 may be 160° C. to 190° C., and T3 may be lower than T2. As described above, by optimizing the temperature ranges according to the locations in the reactor, the degree of crosslinking and a polymerization conversion ratio may be increased, and as a result, productivity may be increased.

Further, in the method of preparing the ethylene-vinyl acetate copolymer of the present invention, the initiator is divided and introduced into the upper end and the lower end of the reactor, and at this time, the amount of the initiator introduced into the lower end of the reactor satisfies the range of 12% by weight to 22% by weight with respect to the total amount of the initiator introduced into the reactor.

When the initiator is divided and introduced into the upper end and the lower end of the reactor, the flow of the monomer introduced in the gas phase may be properly divided at the upper end and the lower end of the reactor. That is, since the gas-phase monomer is collected in the zone into which the initiator is introduced, the flow of the gas in the reactor may be controlled by controlling the amount of the initiator introduced into the upper end and the lower end of the reactor.

At this time, when the amount of the initiator introduced into the lower end of the reactor is less than 12% by weight with respect to the total amount of the initiator, it is difficult to secure the effect of controlling the flow of gas and to prepare the ethylene-vinyl acetate copolymer having the above-described physical properties, and when the amount is more than 22% by weight, there is a problem in reaction stability.

Further, under the conditions satisfying the above temperature range and the input of the initiator, a pressure of the autoclave reactor may be 1800 bar to 2100 bar.

The pressure of the reactor means a pressure measured by an internal pressure sensor in the reactor. Under the pressure of the above range, the ethylene-vinyl acetate copolymer having excellent mechanical properties such as tensile strength, etc. may be prepared with a high conversion ratio.

Further, in the method of preparing the ethylene-vinyl acetate copolymer, the vinyl acetate monomer and the ethylene monomer are introduced in the gas phase, respectively. At this time, the temperature of the monomers introduced into the autoclave reactor may be 10° C. to 50° C., and more specifically 30° C. to 50° C.

Further, the vinyl acetate monomer may be used in an amount of 25% by weight to 35% by weight, and more specifically 27% by weight to 30% by weight, with respect to the total weight of the ethylene monomer and the vinyl acetate monomer.

Meanwhile, the initiator used in the method of preparing the ethylene-vinyl acetate copolymer may be an organic peroxide-based low-temperature initiator; or a high-temperature initiator, and of them, any one or a mixture of two or more thereof may be used.

The low-temperature initiator refers to an initiator capable of initiating and/or promoting the reaction between the ethylene monomer and the vinyl acetate monomer at a temperature of 130° C. or higher and lower than 170° C., and the high-temperature initiator refers to an initiator capable of initiating and/or promoting the reaction at a temperature of 170° C. or higher and 230° C. or lower.

In general, when only one initiator is used in the preparation of the ethylene-vinyl acetate copolymer, the initiator does not react at an excessively low operating temperature, and the initiator may decompose before polymerizing the copolymer at an excessively high reaction temperature, and as a result, the initiator efficiency may decrease or runaway reaction may occur.

Therefore, according to the method of preparing the ethylene-vinyl acetate copolymer of one embodiment of the present invention, polymerization may be performed by varying the polymerization temperature according to the location in the reactor, and a mixture of an organic peroxide-based low-temperature initiator and a high-temperature initiator is used as the initiator, thereby controlling the degree of the polymerization reaction according to each temperature region.

Specifically, according to one embodiment of the present invention, the low-temperature initiator and the high-temperature initiator may be used at a weight ratio of 5:95 to 95:5. When the initiators are used at the above weight ratio, the degree of the polymerization reaction may be controlled according to each temperature region, thereby increasing polymerization efficiency. More specifically, the initiators may be used at a weight ratio of 10:90 to 90:10, or 20:80 to 70:30.

The low-temperature initiator is characterized in that it is able to initiate the polymerization reaction at a lower temperature than a general high-pressure radical polymerization temperature, and for example, one or more compounds selected from the group consisting of DIPND (1,4-di(2-neodecanoylperoxyisopropyl)benzene), CUPND (cumylperoxy neodecanoate), SBPC (di(sec-butyl) peroxydicarbonate), NBPC (di(n-butyl)peroxydicarbonate), EHP (di(2-ethylhexyl) peroxydicarbonate), TAPND (tert-amylperoxyneodecanoate), and TBPND (tert-butyl peroxyneodecanoate) may be used.

Further, the high-temperature initiator is characterized in that it is able to initiate the polymerization reaction at a higher temperature than the general high-pressure radical polymerization temperature, and for example, one or more compounds selected from the group consisting of TAPPI (tert-amylperoxy pivalate), TBPPI (tert-butylperoxy pivalate), INP (di(3,5,5-trimethylhexanoyl) peroxide), TAPEH (tert-amylperoxy 2-ethylhexanoate), TBPEH (tert-butylperoxy 2-ethylhexanoate), TBPIB (tert-butylperoxy-isobutyrate), TBPIN (tert-butylperoxy-3,5,5-trimethylhexanoate), and TBPA (tert-butylperoxyacetate) may be used.

Further, the low-temperature initiator and the high-temperature initiator may be used in an amount of 20% by weight to 80% by weight, preferably 30% by weight to 70% by weight, after diluting an initiator stock solution with a hydrocarbon solvent. At this time, as the hydrocarbon solvent, for example, one or more selected from the group consisting of n-decane, n-octane, iso-dodecane, and iso-octane may be used, or an Isopar-based solvent which is a commercial hydrocarbon mix product may be used.

Further, the total amount of the used initiators including the low-temperature initiator and the high-temperature initiator may be about 60 ppm or more, about 70 ppm or more, or about 80 ppm or more, and about 170 ppm or less, about 160 ppm or less, or about 150 ppm or less with respect to the total amount of the ethylene monomer and the vinyl acetate monomer. When the amount of the used initiators is too small, the reaction may not properly proceed, and when the amount of the used initiators is too large, a runaway reaction may occur due to abnormal reaction.

As described above, the ethylene-vinyl acetate copolymer having the high degree of crosslinking and vinyl acetate content while having the reduced MI and the optimized ratio of $\eta^*/[\eta]$ may be prepared by controlling the temperature difference in the autoclave reactor and by controlling the flow of gas by controlling the input ratio of the initiator.

Due to the optimized physical properties, the ethylene-vinyl acetate copolymer may exhibit improved mechanical strength together with excellent transparency, adhesive property, and processability. Therefore, the ethylene-vinyl acetate copolymer may be applied to packing materials, wire coating materials, electrical insulators, tapes, adhesives, various sheets, and protective films, or encapsulant materials of optoelectronic devices such as solar cells, and in particular, it may be usefully applied to protective films of optoelectronic devices which are required to have transparency and mechanical strength.

According to another embodiment of the present invention, provided is a molded product including the above-described ethylene-vinyl acetate copolymer, more specifically, a protective film or an encapsulant material of an optoelectronic device.

Hereinafter, the present invention will be described in more detail with reference to the following examples. However, the following examples are for illustrative purposes only, and the detailed description of the present invention is not intended to be limited by the following examples.

EXAMPLE

Examples and Comparative Examples

To an autoclave reactor including eleven reaction zones (sectioned by first to fifth reaction zones: lower portion (T1), sixth to seventh reaction zones: middle portion (T3), and eighth to eleventh reaction zones: upper portion (T2)), 72% by weight of an ethylene monomer and 28% by weight of a vinyl acetate monomer were introduced, and initiators of TBPND and TBPPI were used to allow a reaction under process conditions of the following Table 1, thereby preparing each ethylene-vinyl acetate copolymer. At this time, the temperature of the autoclave reactor was set to satisfy the temperature order of T1>T2>T3 within the temperature range of 150° C. to 220° C.

TABLE 1

| Process conditions | Example 1 | Example 2 | Comparative Example 1 | Comparative Example 2 |
| --- | --- | --- | --- | --- |
| Pressure (bar) | 1,930 | 1,930 | 1,930 | 1,930 |
| Monomer input temperature (° C.) | 40 | 40 | 40 | 40 |
| ΔT | 21 | 38 | 31 | 43 |
| Amount of initiator introduced into lower end (%) | 14.0 | 20.3 | 11.6 | 23.0 |

In Table 1, ΔT is a difference between T1 and T2 (T1−T2), wherein T1 and T2 are temperatures in the fifth and eleventh reaction zones, respectively.

Further, the amount of the initiator introduced into the lower end is a percentage with respect to the total amount of the initiator introduced into the reactor.

Experimental Example

Physical properties of the ethylene-vinyl acetate copolymers prepared in Examples 1 and 2 and Comparative Examples 1 and 2 were measured by the following methods, and are shown in Table 2.

(1) Vinyl acetate (VA) content (% by weight): measured by near infrared spectroscopy (NIR).

(2) Degree of crosslinking (%): 500 g of each ethylene vinyl acetate (EV) copolymer as a base resin prepared in the examples and comparative examples was soaked with 4 ml of tert-butyl peroxy 2-ethylhexyl carbonate (TBEC) and 2.5 ml of triallyl isocyanurate (TAIL) as crosslinking agents, and 1 ml of silane, and manufactured in the form of a sheet in an extruder. Each of the manufactured sheets was cross-linked in a laminating machine at 140° C. for 14 minutes and 30 seconds, then left in toluene for 15 hours, and dried in a convection oven for 3 hours, followed by weighing. The weight ($W_i$) of the sheet before being left in toluene and the weight ($W_d$) of the sheet after being dried were used to calculate the degree of crosslinking according to the following Equation 1.

$$\text{Degree of crosslinking (\%)} = (W_d/W_i) \times 100 \quad \text{[Equation 1]}$$

(3) Melt index (MI, 2.16 kg): measured in accordance with ASTM D1238 at 190° C. under a load of 2.16 kg, and expressed as the weight (g) of the polymer melted for 10 minutes.

(4) Molecular weight distribution (MWD) and number average molecular weight (Mn): measured by size exclusion chromatography (SEC). A PL-GPC instrument (manufactured by Agilent) with a column of PLgel 10 μm Mixed-B (manufactured by Agilent) was used in the measurement, and measurement was performed using 1,2,4-TCB (1,2,4-trichlorobenzene) as a mobile phase under conditions of a temperature of 125° C. and a flow rate of 1 ml/min. In detail, each sample of the ethylene-vinyl acetate copolymers prepared in the examples and comparative examples was dissolved in 1,2,4-TCB at a concentration of 10 mg/10 mL, and 200 μL thereof was introduced. A calibration curve generated with a styrene standard was used to obtain a weight average molecular weight (Mw) and a number average molecular weight (Mn), from which a molecular weight distribution (a ratio of weight average molecular weight/number average molecular weight) was calculated. At this time, 9 kinds of polystyrene standards respectively having a molecular weight of 9,475,000, 597,500, 19,920, 3,507,000, 224,900, 9,960, 1,956,000, 74,800, or 2980 were used.

(5) Ratio of $\eta^*/[\eta]$ $\eta^*$ which is a complex viscosity at zero shear was measured at 160° C. by a method of measuring a melt viscosity using a rotational rheometer, and $[\eta]$ which is an intrinsic viscosity was determined by measuring Newtonian viscosity using the rotational rheometer at 25° C.

TABLE 2

|  | Example 1 | Example 2 | Comparative Example 1 | Comparative Example 2 |
|---|---|---|---|---|
| VA content (% by weight) | 28.0 | 28.4 | 28.7 | 28.5 |
| MI (g/10 min) | 16.0 | 15.3 | 17.9 | 17.1 |
| Mn (g/mol) | 20,400 | 19,200 | 20,500 | 18,700 |
| MWD | 3.30 | 3.37 | 3.27 | 3.43 |
| Ratio of $\eta^*/[\eta]$ (Pa*s/P) | 8,910 | 7,610 | 6,900 | 6,850 |
| Degree of crosslinking (%) | 90.5 | 89.7 | 88.3 | 88.0 |

As an experimental result, the ethylene-vinyl acetate copolymers of Examples 1 to 4 which were prepared by controlling the amount of the initiator introduced into the lower end of the reactor and the temperature of the reactor in the predetermined range showed the high degree of crosslinking and a high ratio of $\eta^*/[\eta]$, as compared with Comparative Example 1.

The invention claimed is:

1. An ethylene-vinyl acetate copolymer satisfying the following conditions of (1) to (4):
   (1) a degree of crosslinking: 89% or more,
   (2) a content of vinyl acetate: 25% by weight to 35% by weight with respect to the total weight of the ethylene-vinyl acetate copolymer,
   (3) a melt index (190° C., 2.16 kg): 10 g/10 min to 19 g/10 min, and
   (4) a ratio of $\eta^*/[\eta]$: 7610 to 9500, where $\eta^*$ represents a complex viscosity at zero shear, as measured at 160° C., and $[\eta]$ represents an intrinsic viscosity, as measured at 25° C.

2. The ethylene-vinyl acetate copolymer of claim 1, wherein the ethylene-vinyl acetate copolymer has a number average molecular weight of 18,000 g/mol to 23,000 g/mol.

3. The ethylene-vinyl acetate copolymer of claim 1, wherein the ethylene-vinyl acetate copolymer has a molecular weight distribution of 3.0 to 4.0.

4. The ethylene-vinyl acetate copolymer of claim 1, wherein the ethylene-vinyl acetate copolymer has a degree of crosslinking of 89% to 93%.

5. A method of preparing the ethylene-vinyl acetate copolymer of claim 1, the method comprising the step of
   polymerizing an ethylene monomer and a vinyl acetate monomer in an autoclave reactor in the presence of an initiator,
   wherein the autoclave reactor includes three or more reaction zones,
   the initiator is introduced into an upper end and a lower end of the autoclave reactor, in which an amount of the initiator introduced into the lower end of the autoclave reactor is 12% by weight to 22% by weight of the total amount of the initiator,
   the reactor satisfies a relationship of a temperature (T1) of one or more reaction zones from the lowermost end>a temperature (T2) of one or more reaction zones from the uppermost end>a temperature (T3) of one or more reaction zones therebetween, and
   ΔT which is a difference between T1 and T2 satisfies 20° C. to 40° C.

6. The method of claim 5, wherein the autoclave reactor includes eleven reaction zones, T1 is a temperature of five reaction zones from the lowermost end, T2 is a temperature of four reaction zones from the uppermost end, and T3 is a temperature of two reaction zones therebetween.

7. The method of claim 5, wherein a pressure of the autoclave reactor is 1800 bar to 2100 bar.

8. The method of claim 5, wherein a temperature at which the monomers are introduced into the autoclave reactor is 10° C. to 50° C.

9. The method of claim 5, wherein the vinyl acetate monomer is included in an amount of 25% by weight to 35% by weight with respect to the total 100% by weight of the ethylene monomer and the vinyl acetate monomer.

10. The method of claim 5, wherein the initiator includes, at a weight ratio of 5:95 to 95:5, a low-temperature initiator that initiates a reaction between the ethylene monomer and the vinyl acetate monomer at a temperature of 130° C. or higher and lower than 170° C., and a high-temperature initiator that initiates the reaction at a temperature of 170° C. or higher and 230° C. or lower.

11. The method of claim 10, wherein the low-temperature initiator includes one or more compounds selected from the group consisting of 1,4-di(2-neodecanoylperoxyisopropyl) benzene, cumylperoxy neodecanoate, di(sec-butyl)peroxydicarbonate, di(n-butyl)peroxydicarbonate, di(2-ethylhexyl)peroxydicarbonate, tert-amylperoxyneodecanoate, and tert-butyl peroxyneodecanoate, and the high-temperature initiator includes one or more compounds selected from the group consisting of tert-amylperoxy pivalate, tert-butylperoxy pivalate, di(3,5,5-trimethylhexanoyl) peroxide, tert-amylperoxy 2-ethylhexanoate, tert-butylperoxy 2-ethylhexanoate, tert-butylperoxy isobutyrate, tert-butylperoxy-3,5,5-trimethylhexanoate, and tert-butylperoxyacetate.

12. The method of claim 5, wherein the total amount of the initiator is about 60 ppm or more, and about 170 ppm or less, with respect to the total amount of the ethylene monomer and the vinyl acetate monomer.

\* \* \* \* \*